US008035242B2

(12) United States Patent
Landa et al.

(10) Patent No.: US 8,035,242 B2
(45) Date of Patent: Oct. 11, 2011

(54) WIND TURBINE FARM AND METHOD OF CONTROLLING AT LEAST ONE WIND TURBINE

(75) Inventors: Bernard Landa, Taylors, SC (US); Carlos Eduardo Latorre, Greer, SC (US); Thomas Frank Fric, Greer, SC (US); Thomas Omar Converse, Lanesborough, MA (US); Thomas Dinjus, Greer, SC (US); Michael Gregory Brown, Simpsonville, SC (US); Gert Torbohm, Rheine (DE); Nadine Schuell, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/942,725

(22) Filed: Nov. 9, 2010

(65) Prior Publication Data

US 2011/0140431 A1 Jun. 16, 2011

(51) Int. Cl.
*F03D 9/00* (2006.01)
*H02P 9/04* (2006.01)

(52) U.S. Cl. ................ 290/44; 290/55; 416/14; 416/42; 416/98

(58) Field of Classification Search .................... 290/44, 290/55; 416/14, 42, 98
See application file for complete search history.

(56) References Cited

U.S. PATENT DOCUMENTS

| 4,518,312 A * | 5/1985 | Jacobs et al. ................ 416/13 |
|---|---|---|
| 4,582,013 A | 4/1986 | Holland, Jr. ................ 114/39.3 |
| 5,193,978 A * | 3/1993 | Gutierrez ..................... 416/24 |
| 5,570,859 A * | 11/1996 | Quandt ......................... 244/213 |
| 6,465,902 B1 * | 10/2002 | Beauchamp et al. ........... 290/55 |
| 6,626,642 B1 * | 9/2003 | Veldkamp ..................... 416/79 |
| 6,752,595 B2 * | 6/2004 | Murakami ..................... 416/87 |
| 6,769,873 B2 | 8/2004 | Beauchamp et al. ............. 416/3 |
| 6,940,185 B2 | 9/2005 | Andersen et al. ............... 290/44 |
| 6,940,186 B2 * | 9/2005 | Weitkamp ..................... 290/44 |
| 7,004,724 B2 | 2/2006 | Pierce et al. .................... 416/61 |
| 7,059,822 B2 * | 6/2006 | LeMieux et al. .............. 415/4.3 |
| 7,095,129 B2 | 8/2006 | Moroz ............................ 290/44 |
| 7,118,338 B2 | 10/2006 | Moroz et al. ..................... 416/1 |
| 7,118,339 B2 | 10/2006 | Moroz et al. ..................... 416/1 |
| 7,153,090 B2 * | 12/2006 | DeLeonardo et al. ......... 415/4.2 |
| 7,160,083 B2 | 1/2007 | Pierce et al. .................... 416/61 |
| 7,246,991 B2 * | 7/2007 | Bosche ......................... 415/14 |
| 7,344,360 B2 * | 3/2008 | Wetzel ......................... 416/238 |
| 7,360,996 B2 * | 4/2008 | Driver ......................... 416/226 |
| 7,530,785 B1 * | 5/2009 | Deering et al. ................... 416/1 |
| 7,690,895 B2 * | 4/2010 | Moroz ..................... 416/132 B |

(Continued)

FOREIGN PATENT DOCUMENTS

EP 1612413 A2 4/2006

(Continued)

*Primary Examiner* — Pedro J Cuevas
(74) *Attorney, Agent, or Firm* — James McGinness, Esq.; Armstrong Teasdale, LLP

(57) ABSTRACT

A method of controlling a wind turbine that includes at least one rotor shaft and at least one blade operatively coupled to the rotor shaft includes measuring a first wind turbine operational condition that is representative of a blade deflection value and generating a first operational condition signal based on that first wind turbine operational condition. The wind turbine also includes a drive train including at least one rotor shaft and an electric generator. The method also includes measuring at least one second wind turbine operational condition and generating at least one second operational condition signal. The method further includes changing the blade deflection value by changing the second operational condition.

20 Claims, 7 Drawing Sheets

U.S. PATENT DOCUMENTS

| | | | |
|---|---|---|---|
| 7,802,968 B2 * | 9/2010 | Jacobsen | 416/228 |
| 7,837,439 B2 * | 11/2010 | Bech | 416/62 |
| 7,857,598 B2 * | 12/2010 | McGeer et al. | 416/240 |
| 7,909,575 B2 * | 3/2011 | Barbu et al. | 416/61 |
| 7,942,634 B2 * | 5/2011 | Christensen | 416/1 |
| 7,967,564 B1 * | 6/2011 | Andersen et al. | 416/1 |
| 2002/0153729 A1 * | 10/2002 | Beauchamp et al. | 290/55 |
| 2003/0123973 A1 * | 7/2003 | Murakami | 415/4.1 |
| 2004/0057828 A1 * | 3/2004 | Bosche | 416/1 |
| 2006/0000269 A1 * | 1/2006 | LeMieux et al. | 73/170.01 |
| 2006/0002797 A1 * | 1/2006 | Moroz et al. | 416/98 |
| 2006/0133937 A1 * | 6/2006 | DeLeonardo et al. | 416/132 B |
| 2007/0025856 A1 * | 2/2007 | Moroz | 416/223 R |
| 2007/0025859 A1 * | 2/2007 | Jacobsen | 416/230 |
| 2007/0036653 A1 | 2/2007 | Bak et al. | 416/98 |
| 2007/0128025 A1 * | 6/2007 | Driver | 416/23 |
| 2008/0101930 A1 * | 5/2008 | Bosche | 416/31 |
| 2009/0067990 A1 * | 3/2009 | Enevoldsen et al. | 415/118 |
| 2009/0068014 A1 * | 3/2009 | Enevoldsen et al. | 416/61 |
| 2009/0097976 A1 * | 4/2009 | Driver et al. | 416/42 |
| 2009/0142193 A1 * | 6/2009 | Bech | 416/144 |
| 2009/0148286 A1 | 6/2009 | Kammer et al. | 416/31 |
| 2009/0202356 A1 * | 8/2009 | Scerbina | 416/227 R |
| 2009/0220340 A1 | 9/2009 | Pierce et al. | 416/36 |
| 2009/0246019 A1 * | 10/2009 | Volanthen et al. | 416/1 |
| 2009/0277266 A1 * | 11/2009 | Wang et al. | 73/514.01 |
| 2009/0321555 A1 * | 12/2009 | Nitzsche et al. | 244/17.13 |
| 2010/0004878 A1 * | 1/2010 | Volanthen et al. | 702/42 |
| 2010/0014981 A1 * | 1/2010 | McGeer et al. | 416/240 |
| 2010/0021303 A1 * | 1/2010 | Nielsen et al. | 416/145 |
| 2010/0098540 A1 * | 4/2010 | Fric et al. | 416/36 |
| 2010/0111693 A1 * | 5/2010 | Wilson | 416/1 |
| 2010/0117361 A1 * | 5/2010 | Christensen | 290/44 |
| 2010/0209247 A1 * | 8/2010 | Becker et al. | 416/1 |
| 2010/0215494 A1 * | 8/2010 | Bech et al. | 416/31 |
| 2010/0239426 A1 * | 9/2010 | Westergaard | 416/226 |
| 2010/0253569 A1 * | 10/2010 | Stiesdal | 342/118 |
| 2011/0098975 A1 * | 4/2011 | Mazzaro et al. | 702/183 |
| 2011/0123330 A1 * | 5/2011 | Matesanz Gil | 416/1 |
| 2011/0135466 A1 * | 6/2011 | Latorre et al. | 416/1 |
| 2011/0142594 A1 * | 6/2011 | Dinjus et al. | 415/4.3 |
| 2011/0144815 A1 * | 6/2011 | Neumann | 700/287 |
| 2011/0150648 A1 * | 6/2011 | Andersen et al. | 416/61 |
| 2011/0150664 A1 * | 6/2011 | Mickeler et al. | 416/241 R |

FOREIGN PATENT DOCUMENTS

| | | |
|---|---|---|
| EP | 2067988 A2 | 10/2009 |
| WO | 2005010358 A1 | 2/2005 |

* cited by examiner

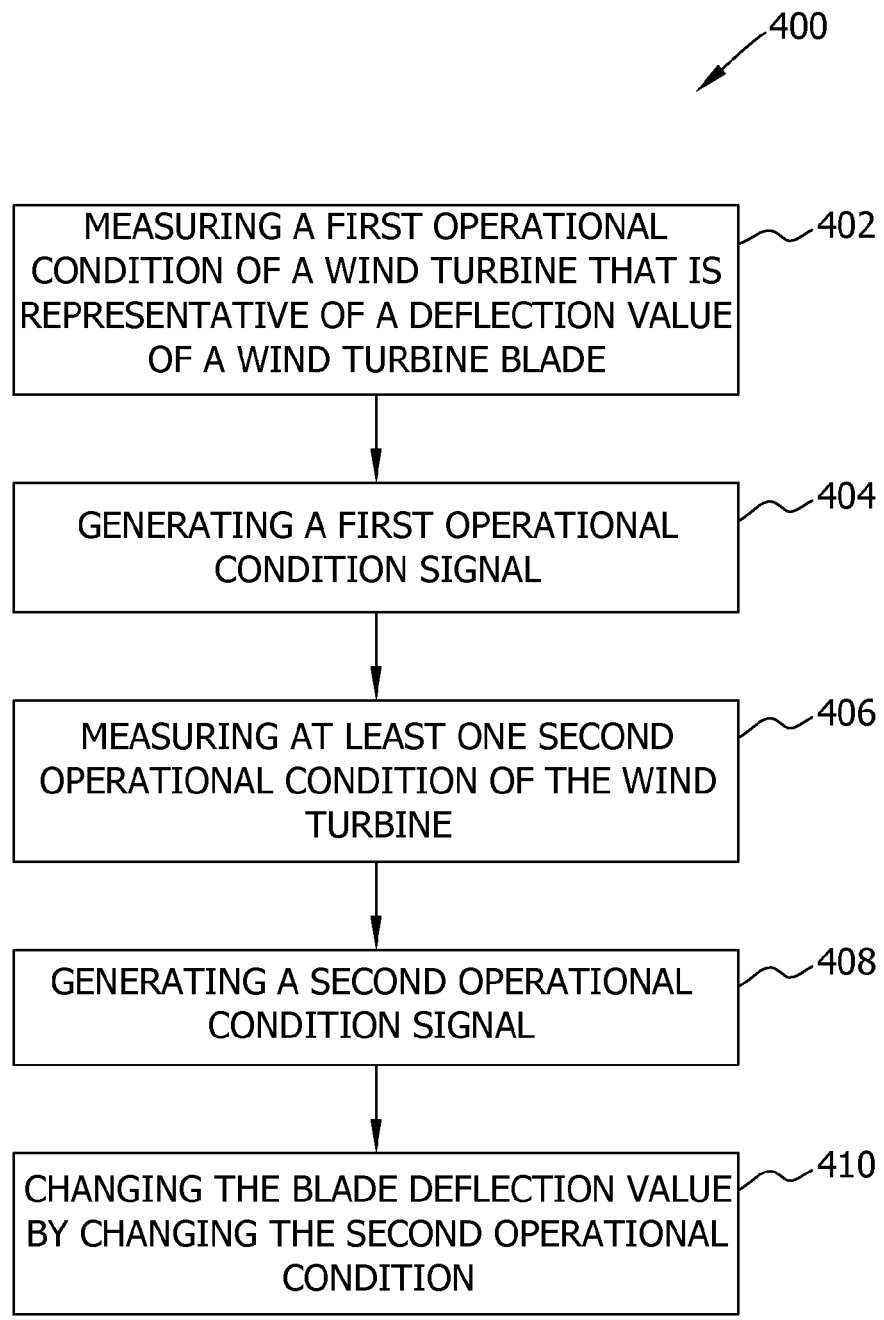

WIND TURBINE FARM AND METHOD OF CONTROLLING AT LEAST ONE WIND TURBINE

BACKGROUND OF THE INVENTION

The subject matter described herein relates generally to wind turbines and, more particularly, to a wind turbine and a method of controlling at least one wind turbine within a wind turbine farm.

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on a base that includes a truss or tubular tower. At least some of the known wind turbines are physically nested together in a common geographical region to form a wind turbine farm.

In at least some known wind turbines, combinations of local air conditions and wind turbine operational conditions cooperate to induce deflections of one or more of the rotating rotor blades. Some of such blade deflections may be sufficient to reduce a distance between the rotating blades and the truss or tubular tower, thereby increasing a probability of contact between the two. Such contact may increase operational maintenance and replacement costs, decrease electric power generation during associated maintenance outages, and decrease expected life spans of the blades and the truss or tower. In some of the known wind turbines, blade deflection sensors are installed on each of the blades to provide indications to operators of existing blade deflections. However, installation of blade deflection sensors increases capital costs of wind turbine construction and operational maintenance costs, including preventative maintenance and calibration activities.

BRIEF DESCRIPTION OF THE INVENTION

In one aspect, a method of controlling a wind turbine is provided. The wind turbine has a drive train including at least one rotor shaft and an electric generator and at least one blade operatively coupled to the rotor shaft. The method includes measuring a first wind turbine operational condition that is representative of a blade deflection value and generating a first operational condition signal based on that first wind turbine operational condition. The method also includes measuring at least one second wind turbine operational condition and generating at least one second operational condition signal. The method further includes changing the blade deflection value by changing the second operational condition.

In another aspect, an aero reduction control system is provided. The aero reduction control system includes at least one first wind turbine input device configured to transmit a first operational signal representative of a first operational condition. The first operational condition includes at least one blade deflection condition. The system also includes at least one second wind turbine input device configured to transmit at least one second operational signal representative of at least one second operational condition. The system further includes at least one wind turbine regulating device. The system also includes at least one processor operatively coupled with the first wind turbine input device, the second wind turbine input device, and the regulating device. The processor is programmed to transmit at least one signal to the wind turbine regulating device to change the second operational condition to change the blade deflection condition.

In yet another aspect, a wind turbine farm is provided. The wind turbine farm includes a plurality of wind turbines and an aero reduction control system implemented in at least a portion of each of the plurality of wind turbines. The aero reduction control system includes at least one first wind turbine input device configured to transmit a first operational signal representative of a first operational condition. The first operational condition includes at least one blade deflection condition. The system also includes at least one second wind turbine input device configured to transmit at least one second operational signal representative of at least one second operational condition. The system further includes at least one wind turbine regulating device. The system also includes at least one processor operatively coupled with the first wind turbine input device, the second wind turbine input device, and the regulating device. The processor is programmed to transmit at least one signal to the wind turbine regulating device to change the second operational condition to change the blade deflection condition.

BRIEF DESCRIPTION OF THE DRAWINGS

FIG. 7 is a flow diagram of an exemplary method of operating the wind turbine shown in FIG. 1 and the wind turbine farm shown in FIG. 4.

DETAILED DESCRIPTION OF THE INVENTION

The embodiments described herein provide a control system for a wind turbine and a wind turbine farm that implements an aero load reduction control system. The control system is integrated within existing wind turbine and wind turbine farm hardware and software to measure and control wind turbine blade deflections. More specifically, the aero load reduction control system dynamically determines wind turbine blade deflection values, compares such existing values to predetermined blade deflection parameters, and modifies operational conditions of the affected wind turbine to reduce such deflections to within such predetermined parameters (if necessary) or prevent exceedance of such parameters. In one embodiment, blade deflections of each wind turbine are controlled individually via wind turbine controllers dedicated to such individual wind turbine. In another embodiment, blade deflections of a plurality of wind turbines in a wind turbine farm are controlled together or individually via a wind turbine farm controller. Further, both embodiments use existing hardware such as sensors and processors, therefore, implementation of the embodiments of the aero load reduction control system as described herein decreases capital costs of construction and operational costs associated with routine preventative and corrective maintenance.

A technical effect of the aero load reduction control system described herein is to reduce blade deflections on wind turbines, thereby decreasing a potential for contact between a blade and a wind turbine tower. More specifically, a technical effect of the aero load reduction control system described herein includes determining blade deflections while the wind turbine is in operation and controlling at least one operational feature of the wind turbine to reduce the blade deflections such that blade deflections are maintained within predetermined parameters. A further technical effect of the control system as described herein is to determine and control blade deflections for a plurality of wind turbines nested in a wind turbine farm.

Figure 1:
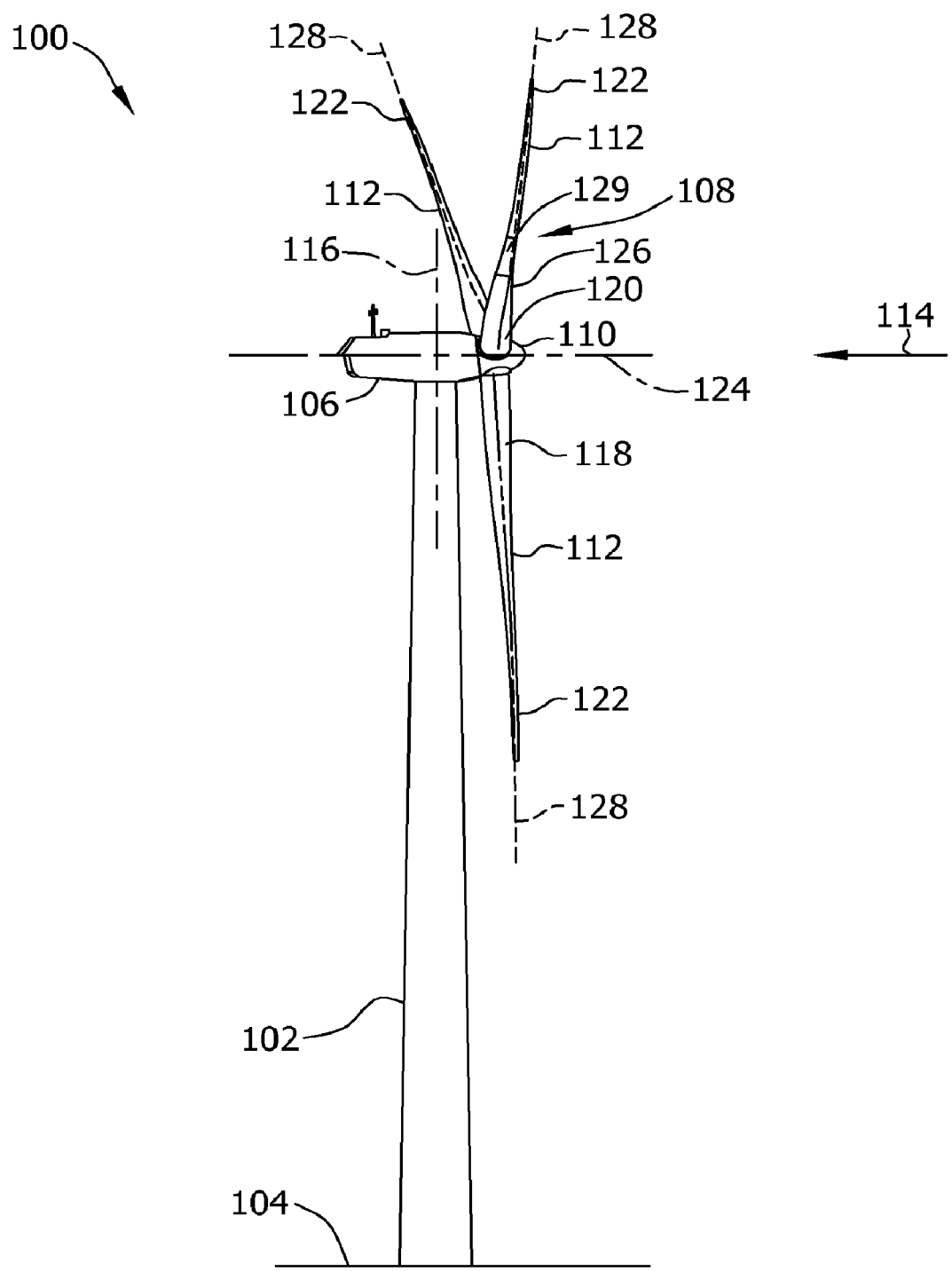
FIG. 1 is a schematic view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective, or azimuth angle, of rotor blades 112 with respect to the direction of wind 114. Rotor blades 112 are mated to hub 110 by coupling a blade root portion 118 to hub 110 at a plurality of load transfer regions 120. Each load transfer region 120 has a hub load transfer region and a blade load transfer region (both not shown in FIG. 1). Loads induced to rotor blades 112 are transferred to hub 110 via load transfer regions 120. Each rotor blade 112 also includes a blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, blade lift forces are induced to rotor blade 112 and rotation of rotor 108 about an axis of rotation 124 is induced as blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). Increasing a pitch angle of rotor blade 112 decreases blade deflection by reducing aero loads on rotor blade 112 and increasing an out-of-plane stiffness from the change in geometric orientation. The pitch angles of rotor blades 112 are adjusted about a pitch axis 128 at each rotor blade 112. In the exemplary embodiment, the pitch angles of rotor blades 112 are controlled individually. Alternatively, the pitch angles of rotor blades 112 are controlled as a group.

Each blade 112 also includes at least one deflectable blade flap 129 that is coupled to a blade flap drive mechanism (not shown). In one embodiment, blade flap 129 is hingedly or pivotally coupled to the blade flap drive mechanism. Blade flap 129 is typically flush with blade surface area 126, however, on occasion, blade flap 129 is deflected outward from area 126 to induce drag forces on blade 112 to counter the induced rotational forces described above.

Figure 2:
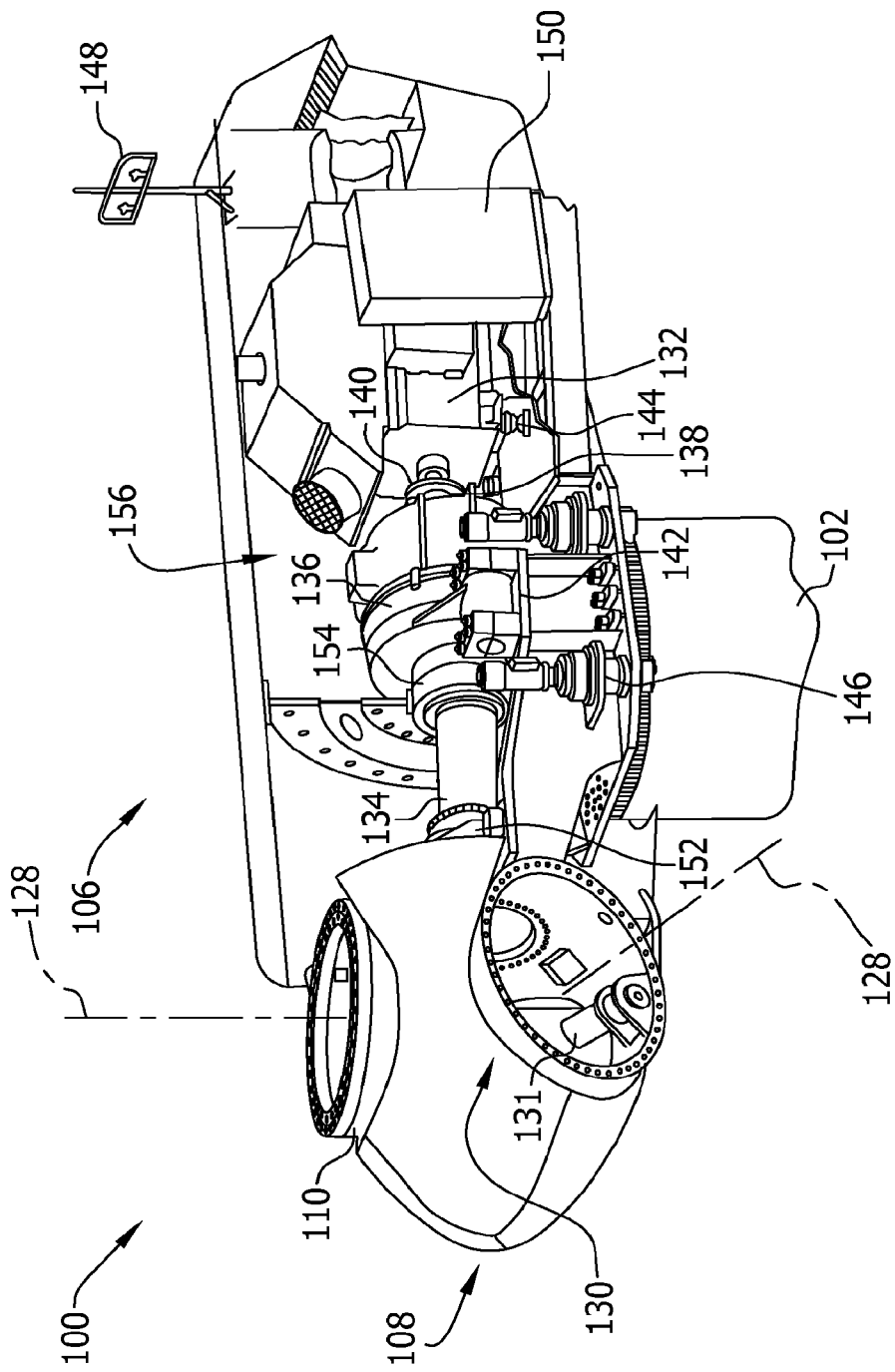
FIG. 2 is a partial sectional view of an exemplary nacelle suitable for use with the wind turbine shown in FIG. 1.

FIG. 2 is a partial sectional view of nacelle 106 of exemplary wind turbine 100. Various components of wind turbine 100 are housed in nacelle 106. In the exemplary embodiment, rotor 108 includes three pitch assemblies 130. Each pitch assembly 130 is coupled to an associated rotor blade 112 (shown in FIG. 1), and modulates a pitch of associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by support 142 and generator 132 is supported by support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, mast 148 provides information, including wind direction and/or wind speed, to a control system cabinet 150. Control system cabinet 150 includes one or more controllers or other processors configured to execute control algorithms and control logic. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, control system cabinet 150 may house sufficient processing capabilities to execute support applications including, without limitation, a Supervisory, Control and Data Acquisition (SCADA) program.

In the exemplary embodiment, control system cabinet 150 is positioned within nacelle 106. Alternatively, control system cabinet 150 is positioned within tower 102 (shown in FIG. 1), for example, near ground 104 (shown in FIG. 1). In other embodiments, control system cabinet 150 is positioned any place that enables operation of wind turbine 100 as described herein including, without limitation, in a remote enclosure (not shown) positioned some distance from wind turbine 100.

Pitch assembly 130 is operatively coupled to control system cabinet 150. In the exemplary embodiment, nacelle 106 also includes a main or forward support bearing 152 and an aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Alternatively, nacelle 106 includes any number of support bearings that enable wind turbine 100 to function as described herein. In the exemplary embodiment, rotor shaft 134, generator 132, gearbox 136, high speed shaft 138, coupling 140, and any associated fastening, support, and/or securing device including, without limitation, support 142, support 144, forward support bearing 152, and aft support bearing 154, are collectively referred to as a drive train 156. In addition, in certain embodiments, drive train 156 includes a braking device (not shown) that facilitates reducing a rotational speed of drive train 156.

Figure 3:
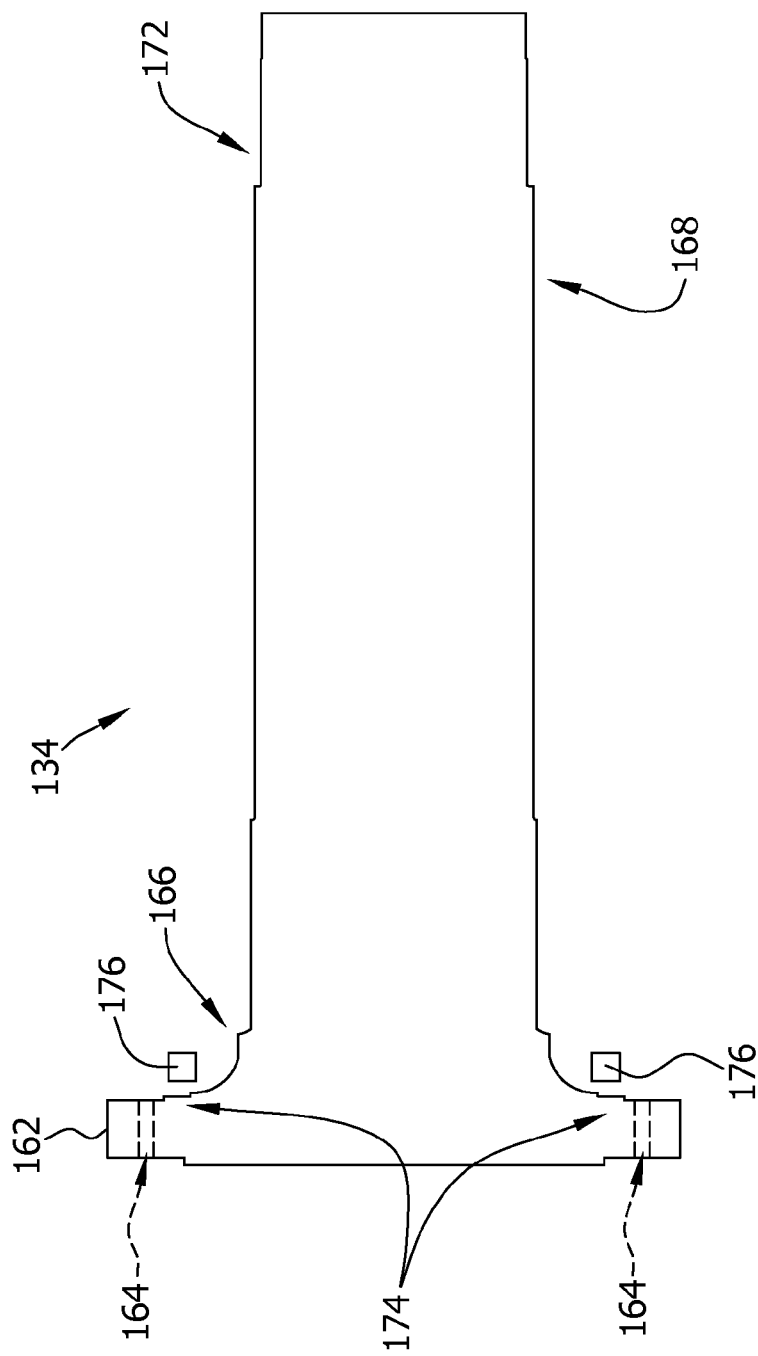
FIG. 3 is a schematic view of an exemplary rotor shaft suitable for use with the nacelle shown in FIG. 2.

FIG. 3 is a schematic view of exemplary rotor shaft 134. In the exemplary embodiment, rotor shaft 134 is a unitary shaft fabricated and formed from any suitable material or combination of materials that enable operation of wind turbine 100 as described herein. Rotor shaft 134 includes a hub attachment flange 162 that defines a plurality of hub attachment fastener passages 164. Flange 162 and passages 164 facilitate coupling rotor shaft 134 to hub 110 (shown in FIGS. 1 and 2).

Rotor shaft 134 defines a forward support bearing region 166 that facilitates coupling forward support bearing 152 (shown in FIG. 2) thereto. Rotor shaft 134 also defines an aft support bearing region 168 that facilitates coupling aft support bearing 154 (shown in FIG. 2) thereto. Moreover, rotor shaft 134 defines a gearbox attachment region 172 that facilitates coupling rotor shaft 134 to gearbox 136 (shown in FIG. 2). Further, rotor shaft 134 defines a high stress region 174 on rotor shaft 134 at hub attachment flange 162. In the exemplary embodiment, rotor shaft 134 is fabricated having relatively high tensile and yield strength parameters such that rotor shaft 134 facilitates receipt of relatively large values of tensile load stresses from hub 110 at high stress region 174. In the exemplary embodiment, expected tensile stresses induced on high stress region 174 during operation range from approximately 50 MPa (7,250 psi) to approximately 500 MPa (72,500 psi).

In general, asymmetric loading across rotor shaft 134 can occur due to conditions that include, without limitation, vertical and horizontal wind shears and localized turbulence acting on wind turbine rotor blades 112 thereby inducing a deflection on blades 112. Such asymmetric loads acting on wind turbine rotor blades 112 also translate into moments acting on hub 110 and subsequently rotor shaft 134. These moments are manifested as strains and/or deflections at high stress region 174 on hub attachment flange 162. Measurement of shaft deflections, for example, axial displacement, may be used to determine a magnitude of asymmetric loading and deflection of blades 112.

In the exemplary embodiment, a plurality of sensors 176 that include, without limitation, proximity sensors measure deflections of hub attachment flange 162 at high stress region 174. Any number of sensors 176 in any arrangement, orientation, and configuration that enables operation of wind turbine 100 as described herein can be used. Sensors 176 are operatively coupled to control system cabinet 150 such that, for example, cabinet 150 transmits blade pitch command signals to each pitch drive motor 131 (shown in FIG. 2) to modulate a pitch angle of each blade 112 about respective pitch axis 128 (both shown in FIG. 1) to reduce asymmetric rotor loading and balance loads across wind turbine rotor 108, including hub 110 and hub attachment flange 162.

Figure 4:
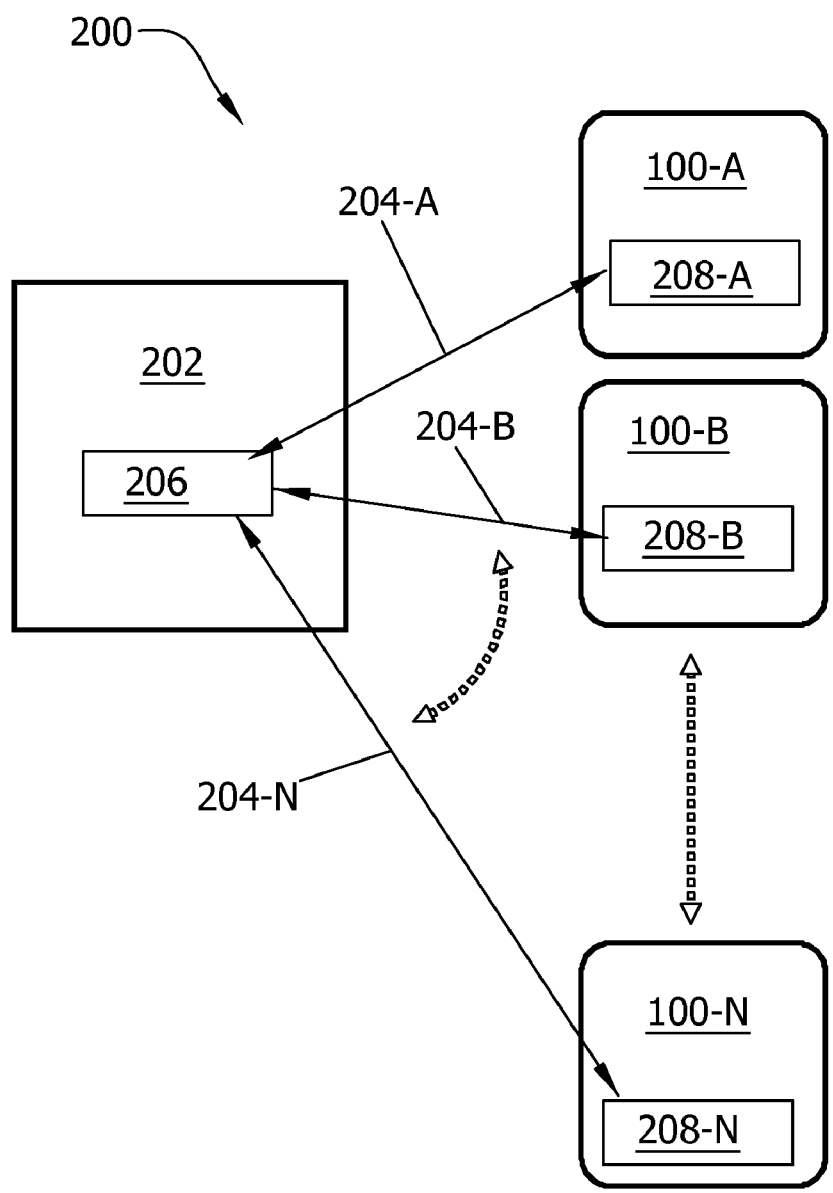
FIG. 4 is a schematic view of an exemplary wind turbine farm that includes the wind turbine shown in FIG. 1.

FIG. 4 is a schematic view of an exemplary wind turbine farm 200 that includes at least one wind turbine 100. In the exemplary embodiment, wind turbine farm 200 includes a plurality of wind turbines 100, the total number of wind turbines 100 designated by the letter N, and N is any integer. More specifically, wind turbine farm 200 includes a first wind turbine 100-A, a second wind turbine 100-B, and a subsequent series of wind turbines 100 up to $N^{th}$ wind turbine 100-N. Each of wind turbines 100-A through 100-N are substantially similar, however, any wind turbine having any configuration may be used. Wind turbine farm 200 also includes a wind turbine farm control system 202 that is operatively coupled to each of wind turbines 100-A, 100-B, through 100-N via associated communications channels 204-A, 204-B, and 204-N, respectively. Channels 204-A through 204-N include communications conduits that include, but are not limited to, CAT-5, CAT-5e, and CAT-6 cables and wireless communications devices. Channels 204-A through 204-N also include any communications protocols that enable operation of each wind turbine 100 and wind turbine farm 200 as described herein including, without limitation, Internet protocols. Also, in the exemplary embodiment, communications channels 204-A through 204-N have substantially similar configurations, however, any configuration of communications channels 204-A through 204-N that enables operation of each of wind turbines 100-A through 100-N and wind turbine farm 200 as described herein can be used.

In the exemplary embodiment, wind turbine farm 200 includes a farm controller 206 and each of wind turbines 100-A, 100-B, and 100-N includes a turbine controller 208-A, 208-B, and 208-N, respectively. Each of turbine controllers 208-A through 208-N are configured within associated control system cabinets 150 (shown in FIG. 2). Alternatively, any portion of turbine controllers 208-A through 208-N are configured within any receptacle and/or cabinet that enables operation of each of wind turbines 100-A through 100-N and turbine farm 200 as described herein. Communication between farm controller 206 and turbine controllers 208-A, 208-B, and through 208-N are facilitated by communications channels 204-A, 204-B, and through 204-N, respectively. Further, in the exemplary embodiment, turbine controllers 208-A through 208-N are substantially similar, however, any of turbine controllers 208-A through 208-N have any configuration that enables operation of each of wind turbines 100-A through 100-N and wind turbine farm 200 as described herein.

Figure 5:
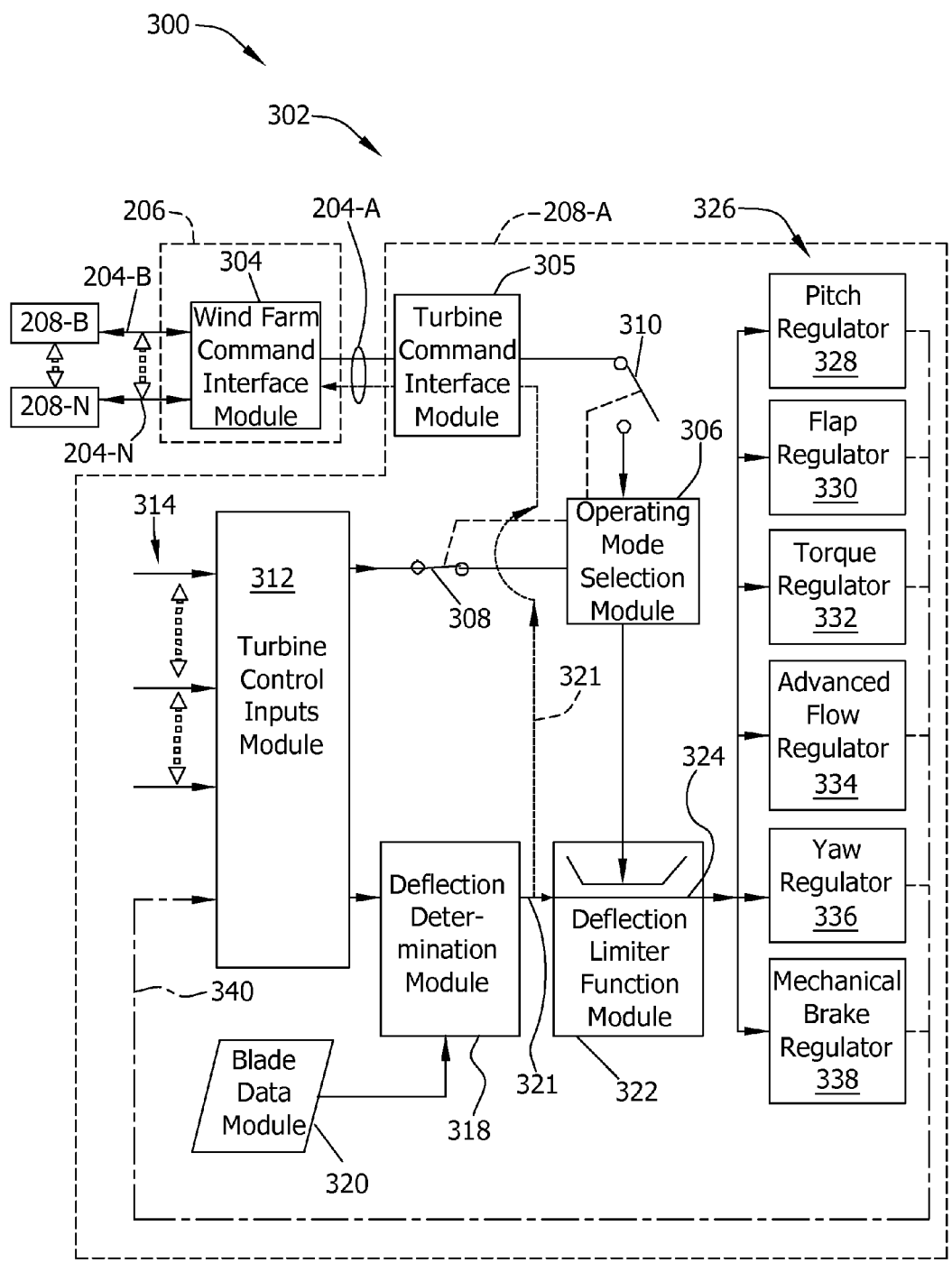
FIG. 5 is a schematic view of a first portion of an exemplary aero load reduction control system suitable for use with the wind turbine farm shown in FIG. 4.

FIG. 5 is a schematic view of a first portion 302 of an exemplary aero load reduction control system 300 suitable for use with wind turbine farm 200 (shown in FIG. 4). In the exemplary embodiment, aero load reduction control system 300 is a distributed control system that is implemented within a plurality of controllers, such as within each of turbine controllers 208-A through 208-N (shown in FIG. 4). Also, in the exemplary embodiment, first portion 302 is implemented within turbine controller 208-A. Further, in the exemplary embodiment, additional portions of system 300 substantially similar to first portion 302 are implemented within each of turbine controllers 208-A through 208-N. Alternatively, each of turbine controllers 208-A through 208-N have any configuration of aero load reduction control system 300 implemented therein that enables operation of each wind turbine 100 and wind turbine farm 200 as described herein. Moreover, in some embodiments, at least a portion of first portion 302 and additional portions (not shown) of aero load reduction control system 300 may be implemented within any processor that enables operation of each wind turbine 100 and wind turbine farm 200 as described herein, including, without limitation, those processors resident within personal computers, remote servers, PLCs, and distributed control system cabinets, and hand-held Internet-enabled devices.

In the exemplary embodiment, first portion 302 includes a wind farm command interface module 304 operatively coupled to all wind turbine controllers 208-A through 208-N via communications channels 204-A through 204-N, respectively. Wind farm command interface module 304 is implemented within wind farm controller 206. First portion 302 also includes a turbine command interface module 305 implemented within first portion 302 and operatively coupled to each of the other turbine controllers 208-B through 208-N via wind farm command interface module 304 and communications channel 204-A. In the exemplary embodiment, both command interface modules 304 and 305 are programmed to facilitate communications between each of turbine controllers 208-A through 208-N and communications between each of turbine controllers 208-A through 208-N with wind farm controller 206.

First portion 302 also includes an operating mode selection module 306 operatively coupled to wind farm command interface module 304. Module 306 facilitates selection of an independent turbine control mode and a wind farm control mode of operation for turbine controller 208-A and first portion 302. More specifically, module 306 operates as a discrete mode selector switch that receives an operator's selection input from one of a physical control board switch (not shown) or a virtual switch emulated on an operator interface panel/screen (not shown). Moreover, module 306 is configured to shift from independent turbine control mode to wind farm control mode automatically to react proactively to conditions that include, without limitation, excessive wind conditions and/or deviations.

In the exemplary embodiment, independent turbine control mode is the default mode of operation of wind turbines 100 within wind turbine farm 200. Independent turbine control mode facilitates each of turbine controllers 208-A through 208-N controlling associated wind turbines 100-A through 100-N, respectively, without influence of wind farm control via wind farm controller 206. In contrast, wind farm control mode is selected through wind farm operator action (described further below) and facilitates control of each of wind turbines 100-A through 100-N via wind farm controller 206 such that predetermined portions of turbine controllers 208-A through 208-N are controlled by wind farm controller 206.

Also, in the exemplary embodiment, when independent turbine control mode is selected, a turbine mode contactor 308 is closed and a wind farm mode contactor 310 is open, thereby isolating turbine controller 208-A from wind farm controller 206. In contrast, when wind farm control mode is selected, turbine mode contactor 308 is open and wind farm mode contactor 310 is closed, thereby facilitating communication between turbine controller 208-A and wind farm controller 206. In the exemplary embodiment, contactors 308 and 310 are "soft" devices programmed within control system 300. Alternatively, contactors 308 and 310 are "hard-wired" devices physically positioned within control system 300.

Further, in the exemplary embodiment, first portion 302 includes a turbine control inputs module 312 operatively coupled to a plurality of input devices, for example, without limitation, meteorological mast 148 (shown in FIG. 2) such that a plurality of discrete and analog inputs 314 are received by module 312. Such inputs 314 include operating conditions inherent to operation of a wind turbine and/or the environmental factors that affect operation of wind turbines that include, without limitation, blade pitch position from pitch drive motor 131 (shown in FIG. 2), yaw position from yaw drive mechanism 146 (shown in FIG. 2), rotor shaft torque, hub speed, wind velocity and/or direction, and localized air temperatures. Furthermore, turbine control inputs module 312 receives signals from sensors 176 (shown in FIG. 3) that include, without limitation, proximity sensors that measure hub attachment flange 162 deflections at high stress region 174 (both shown in FIG. 3).

Moreover, in the exemplary embodiment, first portion 302 includes a deflection determination module 318 operatively coupled to turbine control inputs module 312. First portion 302 also includes a blade data module 320 operatively coupled to deflection determination module 318. Blade data module 320 includes blade data records such as, without limitation, design performance data and empirical performance data as a function of predetermined operating conditions. Deflection determination module 318 is programmed to receive data from blade data module 320 and inputs 314 from turbine control inputs module 312 and determine an inferred, predictive response with respect to deflection of blades 112 (shown in FIG. 1) via a plurality of methods.

A first method for determining an inferred, predictive response with respect to a dynamic deflection of blades 112 includes determining blade deflection reference limits as a function of the blade data records received from blade data module 320. In one embodiment, without limitation, the first method includes determining blade deflection limits as a function of measured wind turbine electric power output values as compared to historically recorded data.

A second method for determining an inferred, predictive response with respect to a dynamic deflection of blades 112 includes dynamically determining existing blade deflection values based on predetermined structural responses of blade 112 to existing loading conditions that are calculated via inputs 314 transmitted from turbine control inputs module 312 and at least one algorithm programmed within deflection determination module 318. Such blade deflection values are compared to known blade deflection limits and an interval to the blade deflection limits is determined.

Further, deflection determination module 318 is programmed with at least one algorithm for determining an inferred, predictive torque value operatively present on drive train 156 (shown in FIG. 2) based on known relationships between at least one of inputs 314 and such torque values. Such values for torque on drive train 156 and deflection of each blade 112 are transmitted as deflection signals 321 to wind farm controller 206 via turbine command interface module 305 and wind farm command interface module 304.

In the exemplary embodiment, first portion 302 includes a deflection limiter function module 322 operatively coupled to deflection determination module 318. Deflection limiter function module 322 is programmed with at least one upper deflection limiting algorithm that is used to generate upper deflection limiting signals 324 as a function of at least one of blade deflection upper limits and predetermined intervals to blade deflection upper limits. Subsequently, in the event a blade deflection upper limit is approached, attained, or exceeded, upper deflection limiting signals 324 are generated and transmitted to at least one of a plurality of wind turbine regulating devices 326. Wind turbine regulating devices 326 are closed loop devices with at least one feedback mechanism defined therein, thereby transmitting a feedback signal 340 to turbine control inputs module 312.

Wind turbine regulating devices 326 include a pitch regulator 328 that is operatively coupled to deflection limiter function module 322 and pitch assembly 130 (shown in FIG. 2). Pitch regulator 328 includes sufficient programming to facilitate modulation of a pitch of blades 112 as a function of deflection limiting signals 324 transmitted from deflection limiter function module 322. Pitch regulator 328 receives deflection limiting signals 324 and drives pitch assembly 130 (shown in FIG. 2) to an angular position about pitch axis 128 (shown in FIG. 2) to facilitate reducing an induced deflection value of blades 112. Pitching of blades 112 facilitates modifying air flow characteristics about each blade 112 and reducing deflection of blades 112 by increasing an out-of-plane stiffness to wind 114 (shown in FIG. 1), that is, blades 112 are driven by pitch assembly 130 to a blade pitch value that reduces the forces induced on blades 112 by wind 114, thereby achieving an aero load reduction.

In the exemplary embodiment, blade pitch is adjusted in predetermined, limited, and discrete pitch increments. Such discrete pitch increments are based on at least one predetermined value and the incremental adjustments are executed as a function of variables that include, without limitation, a magnitude of deflection and an interval of the deflection to the predetermined parameters. Moreover, such periodic blade pitch adjustments are determined as a function of a rate of blade rotation, that is, adjustments to blade pitch made and held static for a period of one full revolution of affected blade 112 followed by a determination for further blade pitch adjustments. Alternatively, blade pitch is adjusted in any manner that enables operation of wind turbine 100 and wind turbine farm 200 as described herein.

Wind turbine regulating devices 326 also include a flap regulator 330 that is operatively coupled to deflection limiter function module 322 and hinged, deflectable blade flap 129 (shown in FIG. 2) via the blade flap drive mechanism (not shown). Flap regulator 330 includes sufficient programming to facilitate modulation of blade flap 129 as a function of deflection limiting signals 324 transmitted from deflection limiter function module 322. Flap regulator 330 receives deflection limiting signals 324 and drives, or extends blade flap 129 to a predetermined position with respect to blade surface area 126 (shown in FIG. 2) as a function of determined blade deflection. Extending blade flap 129 facilitates modifying air flow characteristics about blade 112, thereby reducing deflection of blades 112 by reducing the thrust loads induced on blades 112 by wind 114, thereby achieving an aero load reduction.

In the exemplary embodiment, blade flaps 129 are adjusted in predetermined, limited, and discrete increments. Such discrete increments are based on at least one predetermined value and the incremental adjustments are executed as a function of variables that include, without limitation, a magnitude of deflection and an interval of the deflection to the predetermined parameters. Moreover, such periodic blade flap 129 adjustments are determined as a function of a rate of blade rotation, that is, adjustments to blade flap 129 are made and held static for a period of one full revolution of affected blade 112 followed by a determination for further blade flap 129 adjustments. Such use of blade flaps 129 to reduce blade deflection is referred to as rotor thrust shedding, that is, reducing a potential for blade deflection by reducing a potential for rotor dynamic deflection. Alternatively, blade flaps 129 are adjusted in any manner that enables operation of wind turbine 100 and wind turbine farm 200 as described herein.

Wind turbine regulating devices 326 further include a torque regulator 332 that is operatively coupled to deflection limiter function module 322 and electric generator 132 that induces torque in drive train 156. Torque regulator 330 includes sufficient programming to facilitate modulation of torque in drive train 156 via control of electric power generation in electric generator 132 as a function of deflection limiting signals 324 transmitted from deflection limiter function module 322. Torque regulator 332 receives deflection limiting signals 324 and varies torque induced on drive train 156, which in turn varies rotor speed and thrust load induced by rotor 134.

Wind turbine regulating devices 326 also include an advanced flow control regulator 334 that is operatively coupled to deflection limiter function module 322. In the exemplary embodiment, each turbine blade 112 includes advanced flow control devices (not shown) that include, without limitation, perforations, dimple patterns, portals, or other air flow features on or near surface 126 (shown in FIG. 1) of blade 112 that can generate positive or negative pressures to facilitate maintaining of attached flow or generating separated flow along the chord-wise surface of blade 112. Flow characteristics along the blade surface directly affect the amount of thrust load generated by rotor 134 and the corresponding deflection of blades 112. In the exemplary embodiment, advanced flow control regulator 334 could operate in parallel with other regulating devices, such as, without limitation, pitch regulator 328, flap regulator 330, and torque regulator 332 to affect blade deflection. Therefore, advanced flow control regulator 334 transmits trimming signals to facilitate optimizing flow conditions about blade surfaces 126.

Wind turbine regulating devices 326 also include a yaw regulator 336 that is operatively coupled to deflection limiter function module 322 and yaw drive mechanism 146 (shown in FIG. 2). Yaw regulator 336 includes sufficient programming to facilitate modulation of yaw drive mechanism 146 as a function of deflection limiting signals 324 transmitted from deflection limiter function module 322. Yaw regulator 336 receives deflection limiting signals 324 and drives yaw drive mechanism 146 to an angular position about yaw axis 116 (shown in FIG. 1) to facilitate reducing aeromechanical loading of blades 112. Modifying a yaw position of wind turbine 100 with respect to wind 114 facilitates reducing deflection of blades 112 by decreasing an incident angle of blades 112 to wind 114, that is, wind turbine 100 is driven by yaw drive mechanism 146 to a yaw value that reduces the forces induced on blades 112 by wind 114, thereby achieving an aero load reduction.

In the exemplary embodiment, yaw drive mechanism 146 is adjusted in predetermined, limited, and discrete increments. Such discrete increments are based on at least one predetermined value and the incremental adjustments are executed as a function of variables that include, without limitation, a magnitude of deflection and an interval of the deflection to the predetermined parameters. Moreover, such yaw drive mechanism 146 adjustments are determined as a function of a rate of blade rotation, that is, adjustments to yaw drive mechanism 146 are made and held static for a period of one full revolution of affected blade 112 followed by a determination for further yaw drive mechanism 146 adjustments. Alternatively, yaw drive mechanism 146 is adjusted in any manner that enables operation of wind turbine 100 and wind turbine farm 200 as described herein.

Wind turbine regulating devices 326 further include a mechanical brake regulator 338 that is operatively coupled to a braking device (not shown) for drive train 156. Mechanical brake regulator 338 includes sufficient programming to facilitate modulation of the braking device as a function of deflection limiting signals 324 transmitted from deflection limiter function module 322. Specifically, rotor torque shedding and a reduction in blade deflection are accomplished by reducing an operating rotational speed of drive train 156.

In operation, a plurality of wind turbines 100-A through 100-N that are nested in wind turbine farm 200 generate electric power. For wind turbine 100-A, when turbine controller 208-A, that is, first portion 302 of aero load reduction control system 300 is selected to operate in independent turbine control mode (the default mode) via operating mode selection module 306, turbine mode contactor 308 is closed and wind farm mode contactor 310 is open. Turbine control inputs module 312 receives a plurality of discrete and analog input signals 314 from the plurality of sensors and devices positioned in wind turbine 100-A. Such inputs 314 include rotor deflection signals from sensors 176 that are representative of deflection values of blades 112. Deflection determination module 318 also receives blade data records such as, without limitation, design performance data and empirical performance data as a function of predetermined operating conditions from blade data module 320. Deflection determination module 318 determines an inferred, predictive response with respect to deflection of blades 112 via determining blade deflection reference limits as a function of the blade data records received from blade data module 320. Alternatively, deflection determination module 318 determines an inferred, predictive response with respect to deflection of blades 112 by dynamically determining existing blade deflection values based on predetermined structural responses of blade 112 to existing loading conditions that are calculated via inputs 314 and at least one algorithm programmed within deflection determination module 318. Such blade deflection values are compared to known blade deflection limits and an interval to the blade deflection limits is determined.

Input signals 314 are also transmitted to deflection limiter function module 322 via contactor 308 and operating mode selection module 306. Deflection limiter function module 322 dynamically determines an upper value for blade deflection as a function of existing wind turbine 100-A operational conditions. Deflection determination module 318 generates and transmits deflection signals 321 to deflection limiter function module 322. In the event that signals 321 are less than the upper deflection limit determined within deflection limiter function module 322, no signal is generated by module 322. In the event that signals 321 are equal to or exceed the upper deflection limit, module 322 generates and transmits upper deflection limiting signals 324 to regulators 328 through 338. In the exemplary embodiment, regulators 328 through 338 are programmed to respond in a hierarchal manner with a predetermined priority to reduce deflection of blades 112. Each of regulators 328 through 338 generate and transmit a closed-loop feedback signal 340 to inputs module 312 to facilitate dynamic redeterminations of signals 321 and 324, thereby facilitating a reduction for overshoot by regulators 328 and 338 and a reduction of settling time thereof. Deflection signal 321 is also transmitted to wind farm controller 206 via turbine command interface module 305 and wind farm command interface module 304, thereby facilitating operation of wind turbines 100-B through 100-N that are operating in wind farm control mode, as discussed further below.

In operation, when first portion 302 of aero load reduction control system 300 is selected to operate in wind farm control mode via operator control of operating mode selection module 306, turbine mode contactor 308 is open and wind farm mode contactor 310 is closed. Turbine control inputs module 312, deflection determination module 318, and blade data module 320 function as described above to generate and transmit signal 321. However, rather than deflection limiter function module 322 generating an upper deflection value via inputs module 312, the upper deflection limit is transmitted to module 322 via wind farm command interface module 304 of wind farm processor 206, turbine command interface module 305, contactor 310, and selection module 306. Such upper deflection limits are based on dynamic operating conditions of wind turbines 100-B through 100-N, regardless of the selected operating modes for wind turbines 100-B through 100-N.

Therefore, for example, if wind turbine farm 200 is generating sufficient electrical power, wind farm controller 206 may limit deflection of blades 112 of wind turbine 100-A to smaller values of deflection that would otherwise be used if electric power demands from wind turbine farm 200 was greater and/or turbine controller 208-A is operating in independent turbine control mode. Operation of regulators 328 through 338 and feedback signals 340 is substantially similar to that described above. Furthermore, in general, while operating in wind farm control mode, changing upper blade deflection values of a first wind turbine is facilitated by changing at least one second operational condition of a second wind turbine, and changing a blade deflection value of the second wind turbine is facilitated by changing at least one second operational condition of the first wind turbine.

Figure 6:
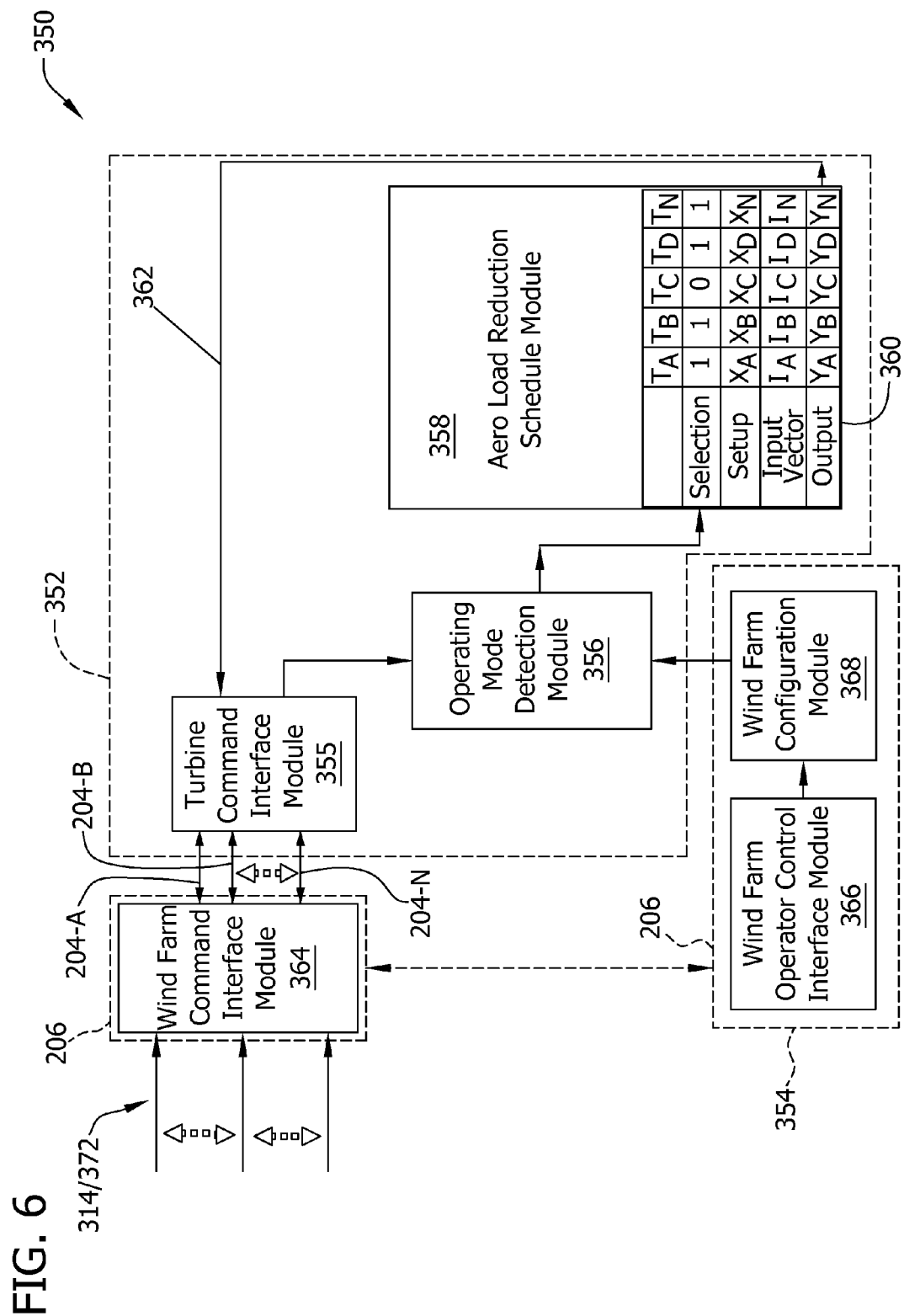
FIG. 6 is a schematic view of an alternative exemplary aero load reduction control system suitable for use with the wind turbine farm shown in FIG. 4.

FIG. 6 is a schematic view of an alternative exemplary aero load reduction control system 350 suitable for use with wind turbine farm 200 (shown in FIG. 4). In this alternative exemplary embodiment, aero load reduction control system 350 is a distributed control system that is implemented within a plurality of controllers, that is, aero load reduction control system 350 is implemented within each of turbine controllers 208-A through 208-N (shown in FIG. 4) and wind farm controller 206. In this alternative exemplary embodiment, aero load reduction control system 350 includes a first portion 352 implemented within each of turbine controllers 208-A through 208-N and a second portion 354 implemented in wind farm controller 206. Further, in this alternative exemplary embodiment, additional portions of system 350 substantially similar to first portion 352 are implemented within each of turbine controllers 208-A through 208-N such that each of turbine controllers 208-A through 208-N includes substantially identical versions of first portion 352 implemented therein. Alternatively, each of turbine controllers 208-A through 208-N have any configuration of aero load reduction control system 350 implemented therein that enables operation of each wind turbine 100 (shown in FIGS. 1, 2, and 4) and wind turbine farm 200 as described herein. Moreover, in some embodiments, at least a portion of first portion 352, second portion 354, and additional portions (not shown) of aero load reduction control system 350 may be implemented within any processor that enables operation of each wind turbine 100 and wind turbine farm 200 as described herein, including, without limitation, those processors resident within personal computers, remote servers, PLCs, and distributed control system cabinets, and hand-held Internet-enabled devices.

In this alternative exemplary embodiment, first portion 352 includes a turbine command interface module 355 implemented within first portion 352 and operatively coupled to each of the other turbine controllers 208-B through 208-N via wind farm command interface module 304 and communications channel 204-A. Turbine command interface module 355 is substantially similar to command interface module 305 (shown in FIG. 5) and facilitates communications between each of turbine controllers 208-A through 208-N and communications between each of turbine controllers 208-A through 208-N with wind farm controller 206.

First portion 352 also includes an operating mode detection module 356 operatively coupled to module 355 and wind park controller 206. Module 356 facilitates detection of the existing control mode of each turbine controller 208-A, 208-B, and 208-N and wind farm controller 206 to determine whether the independent turbine control mode or the wind farm control mode, both as described above, is selected for each wind turbine 100 and/or wind turbine farm 200.

In contrast to operating mode selector module 306 (shown in FIG. 5), which operates as a discrete mode selector switch that receives an operator's selection input from a physical control board switch or a virtual switch emulated on an operator interface panel/screen, operating mode detection module 356 merely detects which mode of control is currently in effect. Therefore, module 356 facilitates informing an operator and appropriate portions of system 350 whether system 350 is operating in the independent turbine control mode or the wind farm control mode.

First portion 352 further includes an aero load reduction schedule module 358 that is operatively coupled to operating mode detection module 356 and wind farm controller 206. Module 358 is programmed with a plurality of predetermined discrete values for each wind turbine 100 in a matrix, that is, an aero load reduction schedule 360. Each of wind turbines 100-A to 100-N are included within schedule 360 and are designated as $T_A$, $T_B$, and through $T_N$ therein.

Schedule 360 also includes a plurality of selection modes, that is, each of wind turbines 100-A to 100-N may be selected to be included within an aero load reduction scheme of wind turbine farm 200 through operator selection via operating mode detection module 356 as a function of the operating mode, that is, independent turbine or wind farm control modes. An "off" selection is designated within schedule 360 as a discrete "0" value and an "on" selection is designated within schedule 360 as a discrete "1" value. When the selection of "off" is made, that particular wind turbine is operating in the independent turbine control mode and is not included within a farm-wide aero reduction scheme. When the selection of "on" is made, that particular wind turbine is operating in the wind farm control mode and is included within a farm-wide aero reduction scheme.

Schedule 360 further includes a plurality of individualized setup configurations for each of wind turbines 100-A to 100-N. These setup configurations are designated as $X_A$, $X_B$, and through $X_N$ therein and may include predetermined static setup values and dynamic setup values. For example, without limitation, setup values $X_A$ for wind turbine 100-A may include a prioritization of regulation as described above for wind turbine regulating devices 326 (shown in FIG. 5). Further, for example, the regulation strategy for wind turbine 100-A may be, in order of priority of execution, pitch control regulation with a minimum pitch value, torque control regulation with a maximum torque value, advanced flow control regulation with a predetermined negative pressure value, and flap regulation is off. Such regulation strategy may be dynamic upon a shift from a wind turbine control mode to a wind farm control mode and a shift from wind farm control mode to wind turbine control mode. Moreover, such shifts and associated dynamic regulation control may include temporal values such that at least some of the regulation shifts to a static mode of regulation from a dynamic mode of regulation after a predetermined period of time. These individualized setup configurations may be either uniform or unique for each wind turbine 100-A through 100-N.

Schedule 360 also includes a plurality of input vector configurations that may be unique or identical for each of wind turbines 100-A to 100-N. Such input vector configurations are designated as $I_A$, $I_B$, and through $I_N$ therein and include a selection of input variables that are input to an associated wind turbine controller 208 from wind farm command interface module 364.

Schedule 360 further includes a plurality of output signals that are unique to each of wind turbines 100-A to 100-N. These output signals are designated as $Y_A$, $Y_B$, through $Y_N$ therein and are collectively referred to as aero load reduction signals 362 and are based on the selected "off" or "on" mode, the selected setup configuration $X_A$ through $X_N$, the selected input vectors $I_A$ through $I_N$, and actual wind turbine 100 and wind turbine farm 200 conditions from wind farm command interface module 364.

In this alternative exemplary embodiment, aero load reduction control system 350 includes second portion 354 implemented within wind farm controller 206. Second portion 354 includes a wind farm command interface module 364 that is substantially similar to wind farm command interface module 304 (shown in FIG. 5). Wind farm command interface module 364 is operatively coupled to all wind turbine controllers 208-A through 208-N via communications channels 204-A through 204-N (shown in FIG. 4), respectively. Wind farm command interface module 364 is implemented within wind farm controller 206. In this alternative exemplary embodiment, both command interface modules 364 and 355 are programmed to facilitate communications between each of turbine controllers 208-A through 208-N and communications between each of turbine controllers 208-A through 208-N with wind farm controller 206.

Also, in this alternative exemplary embodiment, wind farm command interface module 364 is operatively coupled to a plurality of input devices (none shown) such that a plurality of discrete and analog inputs 372 are received by module 364. Module 364 may also receive at least a portion of inputs 314. Such inputs 314 and 372 are associated with wind turbine farm 200 operating conditions inherent to operation of a wind turbine and/or the environmental factors that affect operation of wind turbines that include, without limitation, blade pitch position, rotor shaft torque, hub speed, wind velocity and/or direction, offshore wave size and direction, barometric pressure, and ambient air temperature and humidity.

Also, in this alternative exemplary embodiment, second portion 354 includes a wind farm operator control interface module 366. Module 366 is an operator input device including, without limitation, a human machine interface (HMI) with a graphical user interface (GUI), a keyboard, and a mouse. At the discretion of the farm operator, control of wind turbines 100-A through 100-N may be assumed via module 366.

Moreover, in this alternative exemplary embodiment, second portion 354 includes a wind farm configuration module 368 operatively coupled to wind farm operator control interface module 364 and operating mode detection module 356. Wind farm configuration module 368 facilitates wind turbine farm operator selections for configurations of each wind turbine 100 in wind turbine farm 200 via wind farm operator control interface module 366.

In operation, operating mode detection module 356 senses if aero load reduction control system 350 is selected to operate in independent turbine control mode or wind farm control mode. When independent turbine control mode is selected, inputs 314 and 372 are transmitted to aero load reduction schedule module 358 via wind farm command interface module 364, wind farm configuration module 368, and operating mode detection module 356. If that particular wind turbine is operating in the wind farm control mode, it is included within a farm-wide aero reduction scheme. Subsequently, predetermined portions of inputs 314 and 372 are compared to values programmed into aero load matrix reduction schedule 360 and a plurality of aero load reduction signals 362 that include output signals $Y_A$, $Y_B$, through $Y_N$ that are unique to each of wind turbines 100-A to 100-N are transmitted to turbine command interface module 355. Wind turbines 100-A through 100-N in wind turbine farm 200 operating in wind farm control mode receive the associated output signal and wind turbines 100-A through 100-N operating in independent turbine control mode do not receive the signal transmitted from first portion 352 and continue to operate based on wind-turbine specific operating conditions.

A distinction between aero load reduction control systems 300 and 350 is that control system 300 is configured to dynamically determine an expected blade deflection as a function of dynamic operational measurements and known physical relationships and mitigates such determined blade deflections through a variety of regulators. Control system 300 is configured to provide optimum performance at a turbine level, that is, in independent turbine control mode. In contrast, control system 350 applies a predetermined, static schedule of operating conditions with input from sensors that could be local to the turbine or elsewhere. Also, in contrast to control system 300, control system 350 alters turbine operation and reduces blade deflections without necessarily making direct determinations of blade deflections. Further, in contrast to control system 300, control system 350 is configured to provide optimum performance at a wind farm level, that is, in wind farm control.

FIG. 7 is a flow diagram of an exemplary method 400 of operating wind turbine 100 (shown in FIG. 1) and wind turbine farm 200 (shown in FIG. 4). In the exemplary embodiment, a first operational condition of wind turbine 100 is measured 402 and a first operational condition signal is generated 404 therefrom. The first operational condition is representative of a deflection value of blade 112. Also, in the exemplary embodiment, at least one second wind turbine operational condition is measured 406 and at least one second operational condition signal is generated 408 therefrom. Further, in the exemplary embodiment, the blade deflection value is changed by changing 410 the second operational condition.

The embodiments described herein provide a control system for a wind turbine and a wind turbine farm. In one embodiment, an aero load reduction control system is implemented and integrated within existing wind turbine and wind turbine farm hardware and software to measure and control wind turbine blade deflections. There are two approaches for controlling such wind turbine blade deflections. A first approach is to use the control system to dynamically determine wind turbine blade deflection values, compare such existing values to predetermined blade deflection parameters, and modify operational conditions of the affected wind turbine through at least one regulating device to reduce such deflections to within such predetermined parameters or prevent exceedance of such parameters as measured by closed loop feedback. A second approach is to use predetermined, prioritized responses, programmed in the control system, to reactively respond to wind turbine and/or wind farm conditions to alter and/or accommodate such conditions without closed loop feedback. Blade deflections of each wind turbine are controlled individually via wind turbine controllers dedicated to such individual wind turbine or a plurality of wind turbines in a wind turbine farm are controlled together or individually via a wind turbine farm controller. Further, existing hardware such as sensors and processors are used, therefore, implementation of the aero load reduction control system as described herein decreases capital costs of construction and operational costs associated with routine preventative and corrective maintenance.

Exemplary embodiments of a wind turbine, wind turbine farm, an aero load reduction control system, and a method of operating a wind turbine and wind turbine farm are described above in detail. The wind turbine, wind turbine farm, aero load reduction control system, and method are not limited to the specific embodiments described herein, but rather, components of the wind turbine and/or wind turbine farm and/or the aero load reduction control system and/or steps of the method may be utilized independently and separately from other components and/or steps described herein. For example, the aero load reduction control system and method may also be used in combination with other power systems and methods, and are not limited to practice with only the wind turbine and wind turbine farm as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling a wind turbine that includes a drive train including at least one rotor shaft and an electric generator and at least one blade operatively coupled to the rotor shaft, said method comprising:
    measuring a first wind turbine operational condition and generating a first operational condition signal based on the first wind turbine operational condition;
    generating a blade deflection value as a function of the first operational condition signal, the blade deflection value determined as a function of at least one of:
    a predetermined structural response of the blade; and
    a calculated value of torque induced on the rotor shaft;
    measuring at least one second wind turbine operational condition and generating at least one second operational condition signal; and,
    changing the blade deflection value by changing the second operational condition.

2. A method in accordance with claim 1, wherein measuring a first wind turbine operational condition comprises measuring a deflection of a portion of the rotor shaft.

3. A method in accordance with claim 1, further comprising programming at least one algorithm within at least one processor, the algorithm representative of a relationship between collected wind turbine operational data and dynamic wind turbine blade deflection values.

4. A method in accordance with claim 1, further comprising changing the second operational condition as a function of the first operational condition.

5. A method in accordance with claim 1, wherein changing the blade deflection value by changing the second operational condition comprises at least one of:
modifying air flow characteristics about the blade by changing a blade pitch angle of the blade;
modifying air flow characteristics about the blade by actuating a flap on the blade;
shedding rotor torque by adjusting drive train torque induced by the electric generator;
modifying air flow characteristics about the blade by generating at least one of a positive pressure and a negative pressure to facilitate at least one of attached flow and separated flow along at least a portion of the blade;
inducing a deceleration of the rotor shaft by applying a mechanical rotational resistance to the rotor shaft; and,
modifying air flow characteristics about the blade by changing a yaw position of the wind turbine with respect to a direction of wind.

6. A method in accordance with claim 5, wherein changing the blade deflection value by changing the second operational condition further comprises:
transmitting a blade deflection limiting signal from a blade deflection determination module to a wind turbine regulator; and,
transmitting at least one wind turbine regulator feedback signal from the wind turbine regulator to the blade deflection determination module.

7. A method in accordance with claim 1, further comprising programming at least one algorithm within at least one processor, the algorithm representative of at least one operational parameter of at least one measured second wind turbine operational condition.

8. A method in accordance with claim 7, wherein changing the blade deflection value by changing the second operational condition comprises changing at least one measured second operational condition as a function of the algorithm programmed within the processor.

9. A method in accordance with claim 1, further comprising:
operatively coupling a first wind turbine controller with at least one second wind turbine controller; and,
operatively coupling the first wind turbine controller and the second wind turbine controller with a wind farm controller.

10. A method in accordance with claim 9, wherein changing the blade deflection value by changing the second operational condition comprises at least one of:
changing a blade deflection value of a first wind turbine by changing at least one second operational condition of a second wind turbine; and,
changing a blade deflection value of the second wind turbine by changing at least one second operational condition of the first wind turbine.

11. An aero reduction control system, comprising:
at least one first wind turbine input device configured to transmit a first operational signal representative of a first operational condition;
at least one second wind turbine input device configured to transmit at least one second operational signal representative of at least one second operational condition;
at least one wind turbine regulating device; and,
at least one processor operatively coupled with said first wind turbine input device, said second wind turbine input device, and said regulating device, said processor programmed to:
generate a signal representative of a blade deflection condition as a function of the first operational signal, the blade deflection condition signal determined as a function of at least one of:
a predetermined structural response of a blade; and
a calculated value of torque induced on a rotor shaft coupled to the blade; and
transmit at least one signal to said wind turbine regulating device to change the second operational condition to change the blade deflection condition.

12. An aero reduction control system in accordance with claim 11, wherein said processor is programmed with at least one algorithm representative of a relationship between wind turbine operational data and wind turbine blade deflection values.

13. An aero reduction control system in accordance with claim 11, further comprising:
at least one wind turbine controller; and,
at least one wind farm controller operatively coupled to said wind turbine controller.

14. An aero reduction control system in accordance with claim 11, wherein said wind turbine regulating device comprises at least one of:
a pitch regulator coupled to at least one wind turbine blade pitch assembly;
a flap regulator coupled to at least one wind turbine blade flap;
a torque regulator coupled to an electric generator;
an advanced flow regulator coupled to at least one of said wind turbine blade pitch assembly and said wind turbine blade flap;
a yaw regulator coupled to at least one yaw drive mechanism; and,
a mechanical brake regulator coupled to at least a portion of a wind turbine rotor shaft.

15. A wind turbine farm, comprising:
a plurality of wind turbines; and,
an aero reduction control system implemented in at least a portion of each of said plurality of wind turbines, said aero reduction control system comprising:
at least one first wind turbine input device configured to transmit a first operational signal representative of a first operational condition;
at least one second wind turbine input device configured to transmit at least one second operational signal representative of at least one second operational condition;
at least one wind turbine regulating device; and,
at least one processor operatively coupled with said first wind turbine input device, said second wind turbine input device, and said regulating device, said processor programmed to:
generate a signal representative of a blade deflection condition as a function of the first operational signal, the blade deflection condition signal determined as a function of at least one of:
a predetermined structural response of a blade; and
a calculated value of torque induced on a rotor shaft coupled to the blade; and
transmit at least one signal to said wind turbine regulating device to change the second operational condition to change the blade deflection condition.

16. A wind turbine farm in accordance with claim 15, wherein said processor is programmed with at least one algorithm representative of a relationship between wind turbine operational data and the blade deflection condition.

17. A wind turbine farm in accordance with claim 15, further comprising:
   a first wind turbine controller operatively coupled with at least one second wind turbine controller; and,
   at least one wind farm controller operatively coupled with said first wind turbine controller and said second wind turbine controller.

18. A wind turbine farm in accordance with claim 17, wherein said processor is programmed with at least one algorithm that facilitates operation of said first wind turbine controller and said second wind turbine controller in an independent turbine control mode.

19. A wind turbine farm in accordance with claim 17, wherein said processor is programmed with at least one algorithm that facilitates operation of said first wind turbine controller, said second wind turbine controller, and said wind farm controller in a wind farm control mode.

20. A wind turbine farm in accordance with claim 19, wherein said wind farm control mode facilitates a change of at least one of:
   a blade deflection condition of a first wind turbine by changing at least one second operational condition of a second wind turbine; and,
   a blade deflection condition of said second wind turbine by changing at least one second operational condition of said first wind turbine.

* * * * *